Jan. 29, 1952  A. A. BERESTNEFF  2,583,722
ABSORPTION REFRIGERATION MACHINE
Filed Dec. 15, 1948  2 SHEETS—SHEET 2

INVENTOR.
Alexis A. Berestneff
BY
Henry Reid

Patented Jan. 29, 1952

2,583,722

UNITED STATES PATENT OFFICE 2,583,722

ABSORPTION REFRIGERATION MACHINE

Alexis A. Berestneff, Syracuse, N. Y., assignor to Carrier Corporation, Syracuse, N. Y., a corporation of Delaware Application December 15, 1948, Serial No. 65,482

6 Claims. (Cl. 62—119)

This invention relates to absorption refrigeration systems and more particularly to an absorption refrigeration system including means for withdrawing refrigerant from the system at start-up and for returning the withdrawn refrigerant to the system upon shut-down to dilute the solution employed in the system.

The chief object of the present invention is to provide an absorption refrigeration system including means for diluting the solution of the system upon operation of the system being discontinued for any reason, thereby preventing crystallization or solidification of the solution during such inactive period.

An object of the invention is to provide an absorption refrigeration system including a dilution tank to which refrigerant from the system is supplied during operation of the system and from which refrigerant is supplied to the solution when operation of the system is discontinued.

A further object is to provide an absorption refrigeration system including a pneumatically operated three-way valve to govern supply of refrigerant to a dilution tank during operation of the system and addition of such refrigerant to the solution when operation of the system is discontinued. Other objects of my invention will be readily perceived from the following description.

This invention relates to an absorption refrigeration system comprising in combination an evaporator, an absorber, a generator and a condenser disposed in a closed circuit, means to withdraw cooled refrigerant from the evaporator, a dilution tank, a line connecting said means with the tank whereby the tank is filled with refrigerant when said means is in operation, a second line connecting the tank with a solution line of the system, said tank being adapted to drain into the solution line, and means for opening said first line and for closing said second line when the system is in operation and for closing said first line and for opening the second line when the system is not in operation, whereby solution in the system is diluted when the system is not in operation, and the added refrigerant being withdrawn from the system when the system is in operation.

Figure 1:
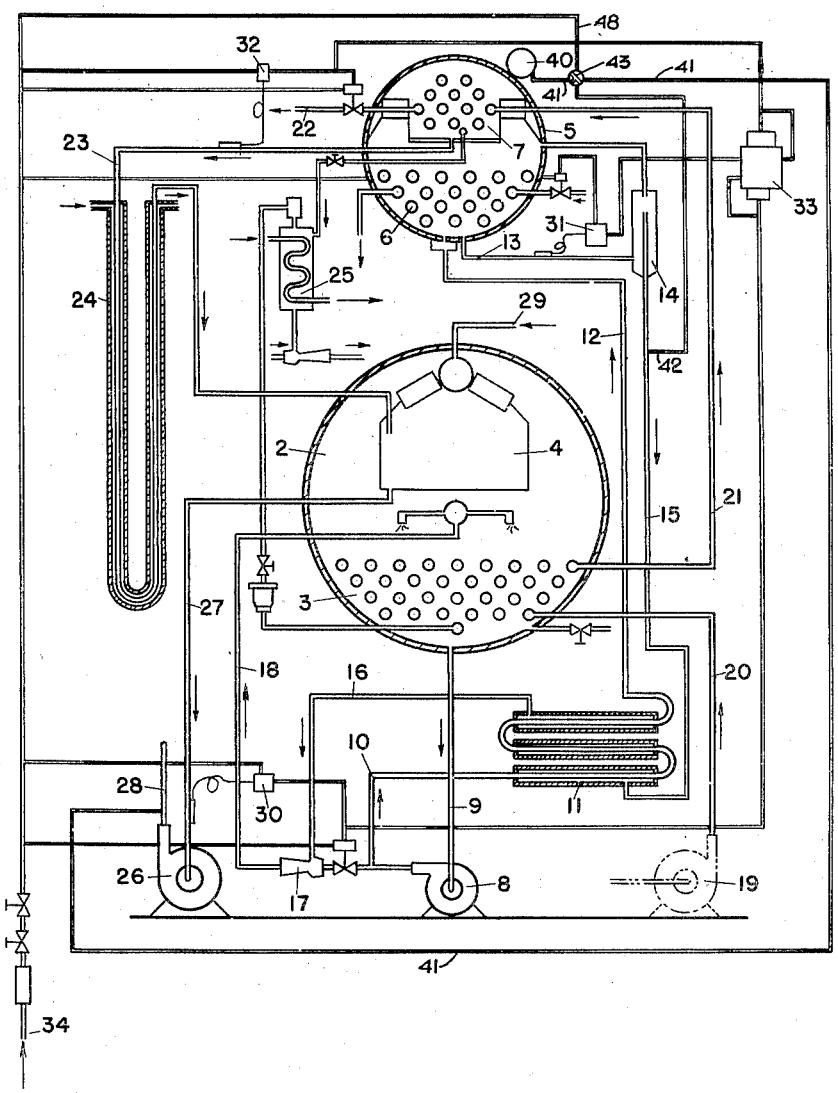
Figure 2:
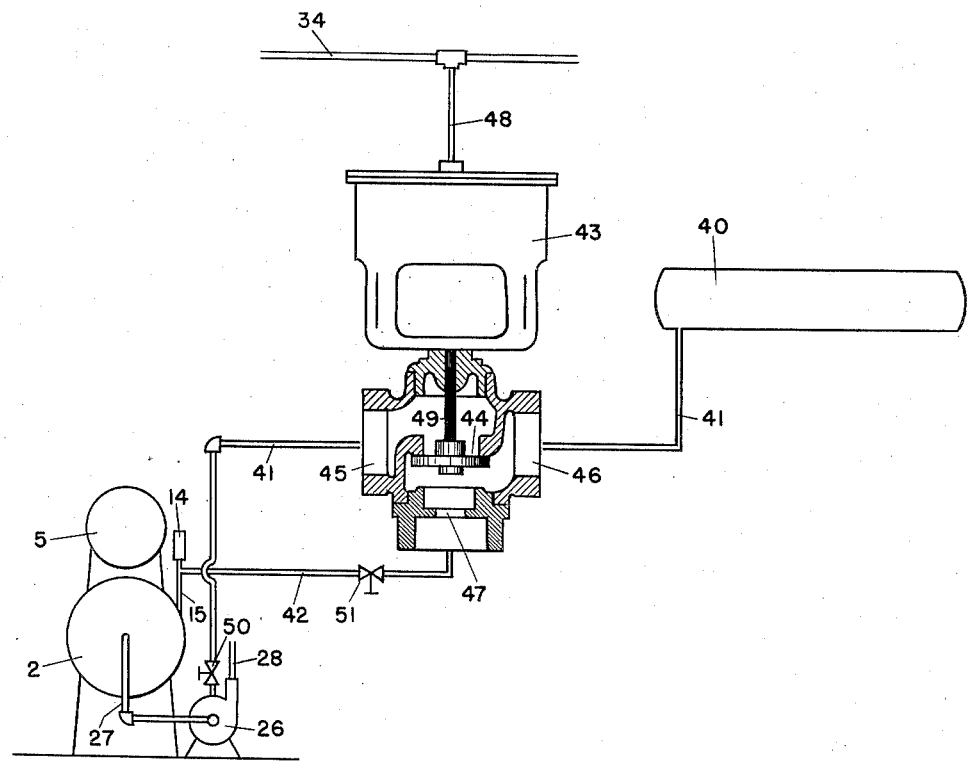

The attached drawing illustrates a preferred embodiment of my invention, in which Figure 1 is a diagrammatic view of an absorption refrigeration system including the solution diluting means of the present invention; and Figure 2 is a sectional view of the three-way valve governing passage of refrigerant to and from the dilution tank.

Referring to the attached drawing, there is shown a shell 2 in which is disposed a coil 3 which cooperates with the shell to form an absorber. A pan-like member 4 is disposed in shell 2 above the absorber and cooperates with the shell to form an evaporator. A second shell 5 is disposed above shell 2. A coil 6 is provided in shell 5 which cooperates therewith to form a generator or boiler. A second coil 7 is disposed above the generator in shell 5 and cooperates with the shell to form a condenser.

Weak solution is withdrawn from absorber 3 by pump 8 through line 9 and is forwarded to generator 6 through line 10, heat exchanger 11 and line 12. Strong solution is withdrawn from the generator 6 through line 13, overflow arrangement 14, line 15, heat exchanger 11, line 16, to ejector 17 which forwards strong solution through line 18 to absorber 3. Arrangement 14 prevents solution in generator 6 rising above or sinking below a predetermined level.

A pump 19 passes cooling water through line 20 to the coil of absorber 3 and then forwards the water after its passage through absorber 3 through line 21 to the coil of condenser 7, such water leaving the condenser through line 22.

A line 23 is used to withdraw vapor condensate from condenser 7, the condensate passing through a precooler 24 and then being returned to evaporator 4. A suitable purge arrangement 25, described and claimed in my copending application Serial No. 29,527, filed May 27, 1948, now Patent No. 2,520,027, dated August 22, 1950, is provided to purge condenser 7 and absorber 3 of non-condensible gases.

Chilled water treated by the system is withdrawn from evaporator 4 by pump 26 through line 27 and is circulated through line 28 to an air conditioning device (not shown) and is returned to the evaporator 4 through line 29. The returned water is sprayed in the evaporator 4 being flash-cooled, the flashed vapor passing downward to be absorbed by solution in the absorber 3 while the chilled water is withdrawn from evaporator 4 as described above. Suitable pneumatic controls designated at 30, 31, 32 and 33 are provided to regulate the operation. Compressed air is supplied to the controls through main air line 34. The above system and the controls therefore are illustrated and claimed in my copending applications Serial Nos. 683,387 and 683,390, filed July 13, 1946, now Patent No. 2,565,943, dated August 28, 1951, and July 13, 1946, now Patent No. 2,565,838, dated August 28, 1951, respectively, and reference is made to such applications for a more complete description of the system and its controls.

The present invention is concerned with equipment permitting a desired amount of refrigerant to be withdrawn from circulation in the system when the machine is placed in operation and to permit return of such refrigerant to the solution to dilute the same when operation of the system for any reason is discontinued thereby preventing crystallization of the solution or damage to the machine resulting from failure of the controls, electrical failure, failure of the various pumps, etc. For this purpose, refer to Figure 2, I provide a diluting tank 40 connected to chilled water pump 26 by line 41. Tank 40 is also connected to strong solution line 15 through a line 42. It is desirable that tank 40 be disposed at a distance above its point of connection with line 15 sufficiently great as to permit refrigerant in the tank to drain into such line by gravity while being so disposed as to prevent any material amount of solution in the system entering the connecting line. The system normally contains an amount of refrigerant greater than required for normal operation. Thus when the system is placed in operation, pump 26 forwards refrigerant to tank 40 until the tank is filled thereby removing such excess refrigerant from the system.

A three-way pneumatically actuated valve 43 is placed in line 41. Valve 43 contains a port 44 through which refrigerant passes from pump 26 to tank 40. Ports 45 and 46 of valve 43 are connected to line 41. A port 47 is also provided in valve 43 connected to line 42. Valve 43 is connected to main air line 34 through air line 48. It contains a valve member 49 adapted to close either port 44 or port 47 as hereinafter described. A suitable spring (not shown) is provided to return valve member 49 to original position when air supply to the valve is discontinued. If desired, manually operable valves 50 and 51 may be placed in lines 41 and 42 respectively to disconnect the diluting apparatus from the refrigerating system when desired.

Considering the operation of the system, compressed air is supplied to the system at start-up. Application of compressed air to valve 43 moves valve member 44 from its first position closing port 44 to a second position closing port 47. Pump 26 is actuated, of course, at start-up and forwards refrigerant through line 41, port 45, port 44 and port 46 to tank 40 thus removing excess refrigerant from the refrigerating system. When operation of the system is discontinued, supply of air to valve 43 is automatically discontinued, permitting the valve spring to return valve member 49 to original position thus closing port 44 and opening port 47. Refrigerant from tank 40 drains by gravity through line 41, port 46, port 47 and line 42 into strong solution line 15 thus diluting the solution in the refrigerating circuit. It will be appreciated line 42 may be connected to another portion of the soluttion circuit if desired, I have found, however, that adding the refrigerant to the solution circuit at line 15 gives very satisfactory results and ensures adequate mixing of the refrigerant with the solution.

The present invention provides an absorption refrigeration system in which simple, economical, automatically operable equipment assures adequate dilution of the solution when operation of the system is discontinued for any reason, thereby preventing crystallization when the system is not in operation. Existing equipment is utilized to remove excess refrigerant from the system during its operation thus maintaining an economical first cost of the system. The present invention permits removal of excess refrigerant from the system as soon as the system is placed in operation while such refrigerant is immediately added to the solution to dilute the same when operation of the system is discontinued.

While I have described a preferred embodiment of my invention, it will be understood my invention is not limited thereto since it may be otherwise embodied within the scope of the following claims.

I claim:

1. In an absorption refrigeration system, the combination of a shell, an element disposed in the shell cooperating therewith to form an absorber, a second element disposed in the shell above the first element cooperating with the shell to form an evaporator, a second shell, a member in the second shell cooperating therewith to form a generator, a second member in the second shell cooperating therewith to form a condenser, a strong solution line connecting the generator and the absorber through which solution flows from the generator to the absorber, means to withdraw refrigerant from the evaporator, a dilution tank, a first line connecting said means with the tank whereby the tank is filled with refrigerant when said means is in operation, a second line connecting the tank with the solution line, said tank being adapted to drain into the solution line, and means for opening said first line and for closing said second line when the system is in operation and for closing said first line and for opening the second line when the system is not in operation whereby solution in the system is diluted when the system is not in operation.

2. An absorption refrigeration system according to claim 1 in which the line opening and closing means comprises a two-way valve, the valve member being actuated by compressed air when the system is placed in operation to move from a first position to a second position and when supply of air to the valve is discontinued to move from the second position to the first position.

3. An absorption refrigeration system according to claim 1 in which the tank is disposed a sufficient distance above the strong solution line to permit refrigerant in the tank to drain by gravity into the strong solution line.

4. In an absorption refrigeration system, the combination of a shell, an element disposed in the shell cooperating therewith to form an absorber, a second element disposed in the shell above the first element cooperating with the shell to form an evaporator, a second shell disposed above the first shell, a member in the second shell cooperating therewith to form a generator, a second member in the second shell disposed above the first member cooperating with the second shell to form a condenser, a pump to withdraw cooled refrigerant from the evaporator of the system, a dilution tank, a line connecting the tank with a solution line of the system, said tank being so disposed that refrigerant therein drains by gravity into the solution line, a second line connecting the pump with the tank to fill the tank with refrigerant when the system is placed in operation, and a two-way pneumatic valve governing supply of refrigerant to the tank and removal of refrigerant from the tank, said valve upon start-up of the system being actuated to move from a first position to a second position to open the second line and to close the first line thereby permitting the pump to supply refrigerant to the tank, and when the system is shut down to move from the second position to the first position to close the second line and to open the first line thereby diluting solution in the system.

5. In an absorption refrigeration system, the combination of an evaporator, an absorber, a generator and a condenser disposed in a closed circuit, means to withdraw refrigerant from the evaporator, a dilution tank, a line connecting said means with the tank whereby the tank is filled with refrigerant when said means is in operation, a second line connecting the tank with the solution line of the system through which solution flows from the generator to the absorber, said tank being adapted to drain into the solution line, and a two-way valve for opening said first line and for closing said second line when the system is in operation, and for closing said first line and for opening the second line when the system is not in operation whereby solution in the system is diluted when the system is not in operation.

6. An absorption refrigeration system according to claim 5 in which the valve member is actuated by compressed air supplied to the controls of the system to move from a first position to a second position, discontinuance in the supply of such air to the valve permitting the valve member to move from the second position to the first position to open the solution line to refrigerant from the tank.

ALEXIS A. BERESTNEFF.

REFERENCES CITED

The following references are of record in the file of this patent:

UNITED STATES PATENTS

| Number | Name | Date |
| --- | --- | --- |
| 2,465,904 | McNeely | Mar. 29, 1949 |